United States Patent
Zhou et al.

(10) Patent No.: US 12,491,687 B2
(45) Date of Patent: Dec. 9, 2025

(54) WELDING HEAD ASSEMBLY

(71) Applicant: SBT ULTRASONIC TECHNOLOGY CO., LTD, Shanghai (CN)

(72) Inventors: Hongjian Zhou, Shanghai (CN); Xinhua Shi, Shanghai (CN)

(73) Assignee: SBT Ultrasonic Technology Co., Ltd., Shanghai (CN)

( * ) Notice: Subject to any disclaimer, the term of this patent is extended or adjusted under 35 U.S.C. 154(b) by 259 days.

(21) Appl. No.: 18/254,710

(22) PCT Filed: Sep. 6, 2021

(86) PCT No.: PCT/CN2021/116703
§ 371 (c)(1),
(2) Date: May 26, 2023

(87) PCT Pub. No.: WO2022/110961
PCT Pub. Date: Jun. 2, 2022

(65) Prior Publication Data
US 2024/0017499 A1    Jan. 18, 2024

(30) Foreign Application Priority Data

Nov. 26, 2020  (CN) .......................... 202022776551.0
May 18, 2021  (CN) .......................... 202110540084.8

(51) Int. Cl.
*B29C 65/08* (2006.01)
*B29C 65/00* (2006.01)

(52) U.S. Cl.
CPC .......... *B29C 65/08* (2013.01); *B29C 66/8145* (2013.01)

(58) Field of Classification Search
CPC ..... B29C 65/08; B29C 66/8145; B23K 20/10; B23K 20/26

(Continued)

(56) References Cited

U.S. PATENT DOCUMENTS

| 4,088,257 A | 5/1978 | Devine |
| 6,811,630 B2 * | 11/2004 | Tominaga ................. B06B 3/00 |
| | | 156/580.2 |

(Continued)

FOREIGN PATENT DOCUMENTS

| CN | 207272423 U | 4/2018 |
| CN | 208662821 U | 3/2019 |

(Continued)

OTHER PUBLICATIONS

Extended European Search Report in European Appln. No. 21896465.8, mailed on Apr. 12, 2024, 8 pages.

(Continued)

*Primary Examiner* — James D Sells
(74) *Attorney, Agent, or Firm* — Fish & Richardson P.C.

(57) ABSTRACT

The objective of the present invention is to provide a welding head assembly that can meet various welding requirements. The welding head assembly for ultrasonic welding to realize the objective mentioned above, comprising an acoustic rod, a vibrating rod and a connecting member, the vibrating rod is separated into two pieces, thereby separated into a first vibrating rod and a second vibrating rod by the acoustic rod, the first vibrating rod is connected with the acoustic rod and the connecting member, one end of the second vibrating rod is connected with the acoustic rod, and the other end of the second vibrating rod is configured to be a welding head working portion; wherein, the acoustic rod, the first vibrating rod and the connecting member are integrally formed as one piece.

20 Claims, 6 Drawing Sheets

(58) Field of Classification Search
USPC .................................................... 156/580.2
See application file for complete search history.

(56) References Cited

U.S. PATENT DOCUMENTS

| | | |
|---|---|---|
| 2003/0066863 A1 | 4/2003 | Skogsmo et al. |
| 2010/0206487 A1 | 8/2010 | Arai et al. |

FOREIGN PATENT DOCUMENTS

| | | |
|---|---|---|
| CN | 110666333 A | 1/2020 |
| CN | 108025388 B | 3/2020 |
| CN | 215919399 U | 3/2022 |
| DE | 10160228 A1 | 6/2003 |
| JP | H 08206854 A | 8/1996 |
| JP | 2019217537 A | 12/2019 |
| KR | H0957468 A | 4/1997 |
| KR | 10-0129952 B | 4/1998 |
| KR | 10-20180020301 A | 2/2018 |

OTHER PUBLICATIONS

Office Action in Korean Appln. No. 10-2023-7020662, mailed on Dec. 13, 2024, 44 pages (with English translation).
Silin et al., "Waveguide Rods Operating in Dome-Shaped Vibration Modes", Ultrasonic Welding, 1st ed., National Defense Industry Press, Dec. 1963, Chapter 7: Design and Analysis of Waveguide Rods and Their Longitudinal Elastic Vibration Amplitudes for Ultrasonic Welding, Section 18, pp. 206-207 (with English Translation).

\* cited by examiner

WELDING HEAD ASSEMBLY

CROSS-REFERENCE TO RELATED APPLICATIONS

This application is a National Stage application under 35 U.S.C. § 371 of International Application No. PCT/CN2021/116703, having an International Filing Date of Sep. 6, 2021, which claims priority to Chinese Application Serial No. 202110540084.8, filed May 18, 2021, and Chinese Application Serial No. 202022776551.0, filed Nov. 26, 2020. The disclosures of these prior applications are considered part of the disclosure of this application, and are incorporated in their entirety into this application.

TECHNICAL FIELD

The invention relates to the field of ultrasonic welding, in particular to a welding head assembly.

BACKGROUND

Ultrasonic welding is to convert utility-frequency alternating current into high-frequency electric energy through an ultrasonic generator, and the converted high-frequency electric energy is then converted into mechanical motion with a same frequency through a transducer, and then the mechanical motion is transmitted to a welding head through a set of horn devices for changing the amplitude, and vibration energy received by the welding head is transmitted to a welding joint portion of a workpiece to be welded, in which area the vibration energy is converted into heat energy by friction for welding.

FIG. 1 shows a schematic diagram of a welding head assembly in prior art, wherein the welding head assembly 9 is formed by connecting a connecting part 91, a welding head part 92, a first part 93 and a second part 94, where the first part 93 and the second part 94 are connected with two sides of the welding head part 92, and a hole portion is generally provided on the welding head part 92, the first part 93 and the second part 94 passes through the hole portion respectively and then are connected by bolts, the first part 93 and the second part 94 are symmetrical about a center of the welding head part 92 after connection.

However, the inventor found that in order to make the welding head assembly meet the acoustic requirements and the first part 93 can be connected with the second part 94, the welding head part 92 in the prior art needs to ensure that a small distance is provided between the first part 93 and the second part 94, thereby limiting the variation in the structural of the welding head part 92, which leads to the limitation of the variation in the welding head assembly.

Therefore, it is urgent to provide a welding head assembly that can meet various welding requirements.

SUMMARY OF THE INVENTION

An objective of the present invention is to provide a welding head assembly that can meet various welding requirements.

The welding head assembly for ultrasonic welding to realize the objective mentioned above, comprising an acoustic rod, a vibrating rod and a connecting member, wherein the vibrating rod is separated into two pieces, thereby separated into a first vibrating rod and a second vibrating rod by the acoustic rod, the first vibrating rod is connected with the acoustic rod and the connecting member, one end of the second vibrating rod is connected with the acoustic rod, and the other end of the second vibrating rod is configured to be the working portion of the welding head;

wherein, the acoustic rod, the first vibrating rod and the connecting member are integrally formed as one piece.

In one or more embodiments, the second vibrating rod is integrally formed as one piece together with the acoustic rod, the first vibrating rod and the connecting member.

In one or more embodiments, during ultrasonic welding, when ultrasonic waves propagate on the first vibrating rod and the second vibrating rod, at least one node of acoustic mode occurs on the first vibrating rod and the second vibrating rod respectively;

wherein, a joint of the connecting member and the first vibrating rod is located at a position of the node.

In one or more embodiments, the acoustic rod extends along a first length direction that is the same as a propagation direction of an ultrasonic wave on the acoustic rod during ultrasonic welding, the first vibrating rod and the second vibrating rod extend along a second length direction respectively, the second length direction is perpendicular to the first length direction;

wherein a length of the first vibrating rod is different from a length of the second vibrating rod in the second length direction.

In one or more embodiments, the length of the first vibrating rod is the same as the length of the second vibrating rod in the second length direction.

In one or more embodiments, the first vibrating rod and/or the second vibrating rod have a variable cross section along the second length direction.

In one or more embodiments, a width of the working portion of the welding head is larger than or equal to a thickness of the working portion of the welding head in a cross section of the working portion of the welding head.

In one or more embodiments, a width of the working portion of the welding head is smaller than a thickness of the working portion of the welding head in a cross section of the working portion of the welding head.

In one or more embodiments, a width of the first vibrating rod is smaller than a thickness of the first vibrating rod in a cross section of the first vibrating rod.

In one or more embodiments, a width of the first vibrating rod is larger than or equal to a thickness of the first vibrating rod in a cross section of the first vibrating rod.

The benefits of the present invention include one or a combination of the following:

The present welding head assembly can be ensured to have a good welding quality by configuring the acoustic rod, the first vibrating rod and the connecting member to be integrally formed as one piece. The configuration of the second vibrating rod is not affected by the first vibrating rod since the vibrating rod is separated into two pieces by the acoustic rod, no matter the second vibrating rod is integrally formed as one piece with the acoustic rod, the first vibrating rod and the connecting member, or the second vibrating rod is manufactured independently and then connected, the second vibrating rod and the working portion of the welding head on its end can be configured to various configurations, so that the working portion of the welding head can meet various welding requirements and welding scenes, and the suitable range of application of ultrasonic welding can also be improved.

BRIEF DESCRIPTION OF DRAWINGS

The above and other features, properties and advantages of the present invention will become more apparent from the following description with respect to the accompanying drawings and embodiments, where.

DESCRIPTION OF THE INVENTION

A variety of embodiments or examples for implementing thematic technical solutions are disclosed as follows. In order to simplify the disclosure, specific embodiments of each element and arrangement are described below. Of course, these are only examples and are not intended to limit the scope of protection of the present application.

Figure 1:
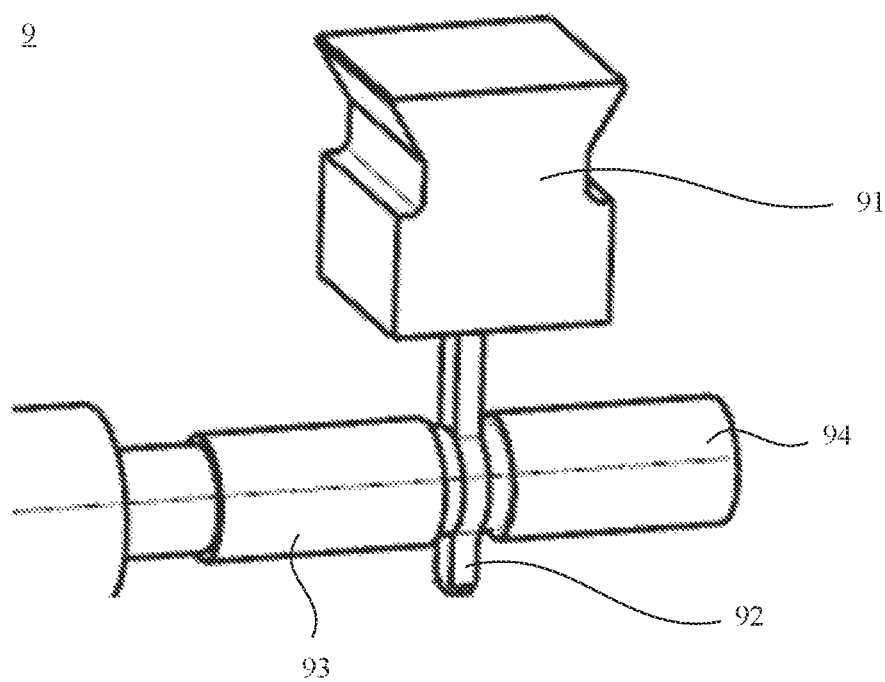
FIG. 1 shows a schematic diagram of a welding head assembly in prior art.
Figure 2:
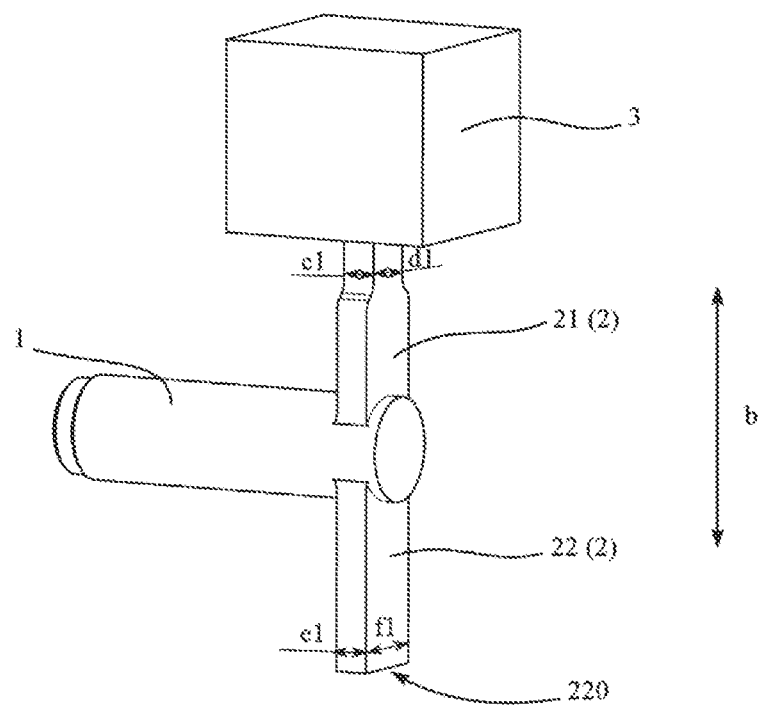
FIG. 2 shows a perspective schematic diagram of the first embodiment of the welding head assembly.
Figure 3:
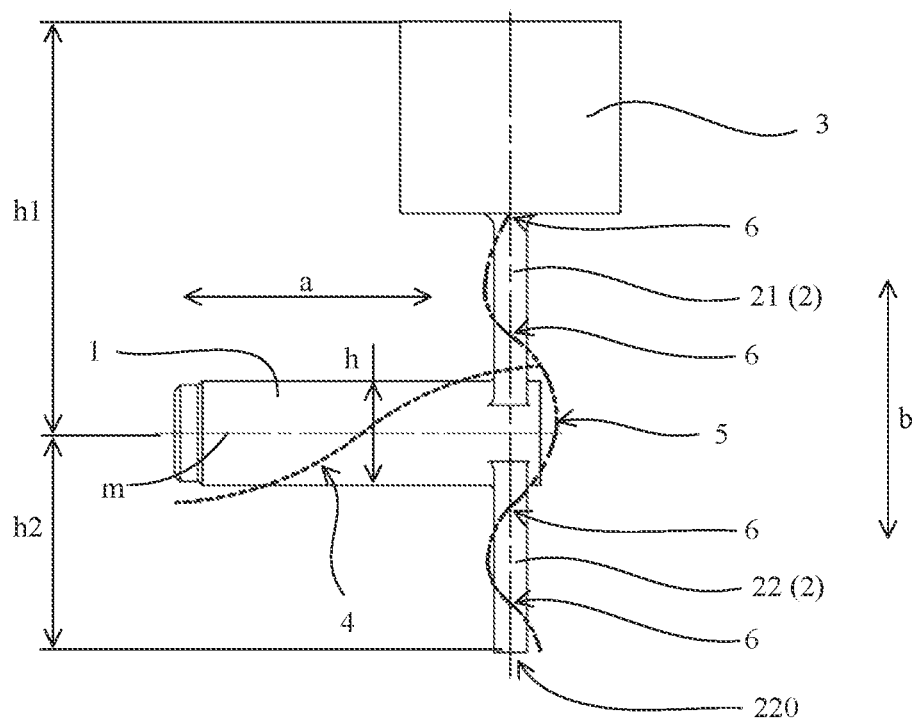
FIG. 3 shows a front schematic diagram of the first embodiment of the welding head assembly.

One aspect of the present invention provides a welding head assembly for ultrasonic welding so as to provide a welding head that can meet various welding requirements, FIG. 2 shows a perspective schematic diagram of a first embodiment of the welding head assembly, and FIG. 3 shows a front schematic diagram of the first embodiment of the welding head assembly. It should be noted that these and other subsequent drawings are only examples, which are not drawn to scale, and should not be taken as a limitation on the actual scope of protection of the present invention. Additionally, the alternative methods in different embodiments can be combined appropriately.

As shown in FIG. 2, the welding head assembly for ultrasonic welding comprises an acoustic rod 1, a vibrating rod 2 and a connecting member 3, wherein the vibrating rod 2 is separated into two pieces, thereby separated into a first vibrating rod 21 and a second vibrating rod 22 by the acoustic rod 1. The term 'separated into two pieces' herein means that the vibrating rod 2 is separated by providing the acoustic rod 1 in between, so that the first vibrating rod 21 and the second vibrating rod 22 are two independent components.

The acoustic rod 1 is a part of the welding head assembly, ultrasonic vibration is along the direction of its axis, and a cross section of the acoustic rod 1 can be circular, square or in other shapes. The acoustic rod 1 can also have a variable cross section for adjusting the amplitude.

The first vibrating rod 21 is connected with the acoustic rod 1 and the connecting member 3, one end of the second vibrating rod 22 is connected with the acoustic rod 1, and the other end of the second vibrating rod 22 is configured to be a welding head working portion 220. It should be understood that, according to the direction shown in the figure, an upper end of the second vibrating rod 22 is connected with the acoustic rod 1 and a lower end of the second vibrating rod 22 is configured to be the working portion of the welding head 220, the working portion of the welding head 220 acts as a portion to be in contact with a welding joint portion of a workpiece to be welded during the process of ultrasonic welding.

Wherein the acoustic rod 1, the first vibrating rod 21 and the connecting member 3 are integrally formed as one piece, manufactured by an integrated forming process. It should be understood that 'the acoustic rod 1, the first vibrating rod 21 and the connecting member 3 are integrally formed as one piece' means that the acoustic rod 1, the first vibrating rod 21 and the connecting member 3 are configured to be a one-piece structure, manufactured by the integrated forming process comprising but not limited to machining, casting or additive manufacturing from the same workblank or row material.

In some prior art, the acoustic rod 1, the first vibrating rod 21 and the connecting member 3 are connected by welding process. Because of the high temperature used in the welding process, or the gas holes and cracks generated during welding, the whole welding head formed by connecting the acoustic rod 1, the first vibrating rod 21 and the connecting member 3 by welding process would be deformed, or it would lead to many issues such as reduction in the quality of the welding head and reduction in the welding performance because of the defects. In some other prior art, the acoustic rod 1, the first vibrating rod 21 and the connecting member 3 are connected by means of fasteners, which would also lead to the reduction in the quality of the welding head and the reduction in the welding performance because of the problems in the quality and accuracy of assembly, meanwhile, connecting by means of fasteners would also limits the outer contour configuration of the vibrating rod and/or the acoustic rod.

By configuring the acoustic rod 1, the first vibrating rod 21 and the connecting member 3 to be integrally formed as one piece, the possibility of the reduction in the welding quality of the welding head assembly because of the quality of assembly or the damage to the components during assembly that may occur in the later assembly process can be reduced.

Further, on the basis of the embodiment mentioned above, the second vibrating rod 22 is integrally formed as one piece with the acoustic rod 1, the first vibrating rod 21 and the connecting member 3, manufactured by the integrated forming process. Likewise, the term 'integrally formed as one piece' means that the acoustic rod 1, the first vibrating rod 21, the connecting member 3 and the second vibrating rod 22 are configured to be a one-piece structure, manufactured by the integrated forming process comprising but not limited to machining, casting or additive manufacturing from the same workblank or row material.

In other embodiments where the second vibrating rod 22 is not integrally formed as one piece with the other components, the second vibrating rod 22 can also be a component that is manufactured independently and then connected to the other components by means of fasteners or welding.

By configuring the second vibrating rod 22 to be integrally formed as one piece with the acoustic rod 1, the first vibrating rod 21 and the connecting member 3, the possibility of the reduction in the welding quality of the welding head assembly because of the quality of assembly or the damage to the components during assembly that may occur in the later assembly process can be reduced.

Correspondingly, by configuring the second vibrating rod 22 to be manufactured independently and then connected to the acoustic rod 1, the first vibrating rod 21 and the connecting member 3, various welding requirements and welding scenes can be met by just replacing with the second vibrating rod 22 with different configurations, and the manufacturing cost of the devices can be reduced.

It should be understood that, either in the embodiment where the second vibrating rod 22 is integrally formed as one piece with the acoustic rod 1, the first vibrating rod 21 and the connecting member 3, or in the embodiment where the second vibrating rod 22 is manufactured independently and then connected to the acoustic rod 1, the first vibrating rod 21 and the connecting member 3, by configuring the acoustic rod 1, the first vibrating rod 21 and the connecting member 3 to be integrally formed as one piece, the welding head assembly can be ensured to have a good welding quality, the second vibrating rod 22 and the working portion of the welding head 220 on its end can be configured to various configurations, so that the working portion of the welding head can meet various welding requirements and welding scenes, and the suitable range of application of ultrasonic welding can be improved. One or more alternative configurations of the welding head assembly will be further described later.

Continue on the first embodiment of the welding head assembly as shown in FIG. 2 and FIG. 3, FIG. 3 schematically shows vibration modes generated when an ultrasonic wave propagates on the acoustic rod 1, the first vibrating rod 21 and the second vibrating rod 22, a dashed curve 4 shows a vibration mode generated when the ultrasonic wave propagates on the acoustic rod 1, a dash-dotted curve 5 shows a vibration mode generated when the ultrasonic wave propagates on the first vibrating rod 21 and the second vibrating rod 22. According to the dash-dotted curve 5 shown in the figure, when the ultrasonic wave propagates on the first vibrating rod 21 and the second vibrating rod 22, there are two nodes 6 of acoustic mode occurs on the first vibrating rod, there are also two nodes 6 of acoustic mode occurs on the second vibrating rod, and a joint of the connecting member 3 and the first vibrating rod 21 is located at a position of the node 6. The term 'node', also named as modal node, refers to a position where the amplitude of vibration tends to be zero, that is, a node is a stationary point in a vibration animation. By configuring the joint of the connecting member 3 and the first vibrating rod 21 to be located at the position of the node 6, the vibration of the connecting member 3 during the welding process can be greatly attenuated.

Further, in the first embodiment of the welding head assembly as shown in FIG. 2 and FIG. 3, the acoustic rod 1 extends along a first length direction (a) that is the same as a propagation direction of an ultrasonic wave on the acoustic rod during ultrasonic welding, the first vibrating rod 21 and the second vibrating rod 22 extend along a second length direction (b) respectively, the second length direction (b) is perpendicular to the first length direction a, so that the first vibrating rod 21 and the second vibrating rod 22 are connected to two sides of the acoustic rod 1.

The first vibrating rod 21 has a width (c1) and a thickness (d1), the working portion of the welding head 220 of the second vibrating rod 22 has a width (e1) and a thickness (f1).

In the first embodiment, as shown in FIG. 2, the first vibrating rod 21 has a variable cross section along the second length direction (b). Specifically, a portion of the joint of the connecting member 3 and the first vibrating rod 21 has a converging and relatively small cross-sectional area as shown in the figure, while the second vibrating rod 22 has a constant cross section along the second length direction (b), the width (c1) of the first vibrating rod 21 is smaller than the thickness (d1) of the first vibrating rod 21 in a cross section of the first vibrating rod 21, therefore the first vibrating rod 21 is in a horizontal vibrating rod configuration. The width (e1) of the working portion of the welding head 220 is also smaller than the thickness (f1) of the working portion of the welding head 220 in a cross section of the working portion of the welding head 220 of the second vibrating rod 22, therefore the second vibrating rod 22 is in a horizontal vibrating rod configuration, in which case the welding head is regarded as a horizontal welding head. By configuring the acoustic rod 1, the first vibrating rod 21 and the connecting member 3 to be integrally formed as one piece, the welding head assembly is in a configuration where a horizontal upper vibrating rod and a horizontal lower vibrating rod are combined, the welding head assembly with such configuration is particularly suitable for a horizontal welding scene where a horizontal space of the upper vibrating rod is not limited and the lower vibrating rod needs a relatively large space for avoiding interference with other components.

Further, in one or more embodiments, the acoustic rod 1 has a central line (m), a distance (h1) is provided between an upper end surface of the welding head formed integrally and the central line (m), a dimension of the distance (h1) is between 143~148 mm, after verification, a better acoustic performance can be obtained when the dimension of the distance (h1) is within the range mentioned above.

Further, in one or more embodiments, a distance (h2) is provided between an lower end surface of the welding head formed integrally and the central line (m), a dimension of the distance (h2) is between 79~87 mm, after verification, a better acoustic performance can be obtained when the dimension of the distance (h2) is within the range mentioned above.

In one or more embodiments, the dimension of the distance (h2) is between 43~63 mm, after verification, a better acoustic performance can be obtained when the dimension of the distance (h2) is within the range mentioned above.

In one or more embodiments, the acoustic rod 1 has an outer diameter or thickness (h), a dimension of the outer diameter or thickness (h) is between 36~42 mm, after verification, a better acoustic performance can be obtained when the dimension of the outer diameter or thickness (h) is within the range mentioned above.

The Second Embodiment

On the basis of the first embodiment, a second embodiment has various modifications as described in the later section. The modifications are described in detail as follows.

Figure 4:
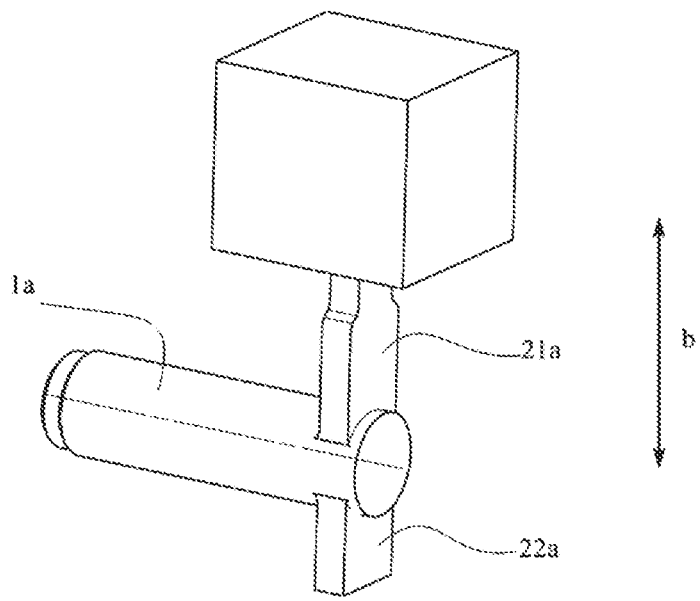
FIG. 4 shows a perspective schematic diagram of the second embodiment of the welding head assembly.
Figure 5:
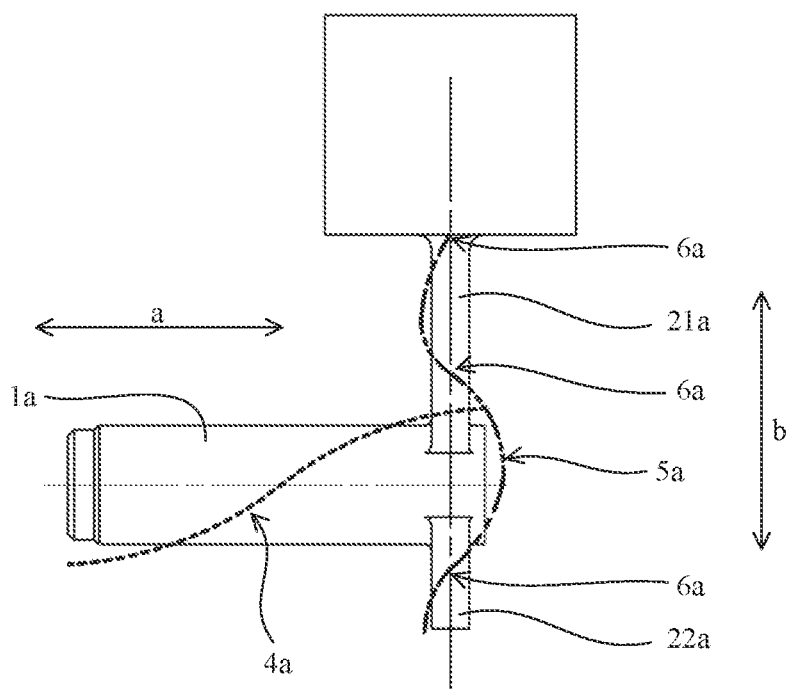
FIG. 5 shows a front schematic diagram of the second embodiment of the welding head assembly.

FIG. 4 shows a perspective schematic diagram of the second embodiment of the welding head assembly, and FIG. 5 shows a front schematic diagram of the second embodiment of the welding head assembly.

In FIG. 5, the dashed curve 4a shows the vibration mode generated when the ultrasonic wave propagates on the acoustic rod 1, the dash-dotted curve 5a shows the vibration mode generated when the ultrasonic wave propagates on the first vibrating rod 21a and the second vibrating rod 22a. According to the dash-dotted curve 5a shown in FIG. 5, when the ultrasonic wave propagates on the first vibrating rod 21a and the second vibrating rod 22a, there are two nodes 6a of acoustic mode occurs on the first vibrating rod 21a, there is one node 6a of acoustic mode occurs on the second vibrating rod 22a.

As shown in FIG. 4, the length of the first vibrating rod 21a is different from the length of the second vibrating rod 22a in the second length direction (b), where the length of the second vibrating rod 22a is smaller than the length of the first vibrating rod 21a. By configuring the acoustic rod, the first vibrating rod and the connecting member to be integrally formed as one piece, the welding head assembly is in a configuration where the lengths of the upper vibrating rod and the lower vibrating rod are different, the welding head assembly with such configuration is particularly suitable for a horizontal welding scene where the horizontal space of the upper vibrating rod is not limited and the lower vibrating rod does not need the relatively large space for avoiding interference with other components.

The Third Embodiment

On the basis of the first embodiment, a third embodiment has various modifications as described in the later section. The modifications are described in detail as follows.

Figure 6:
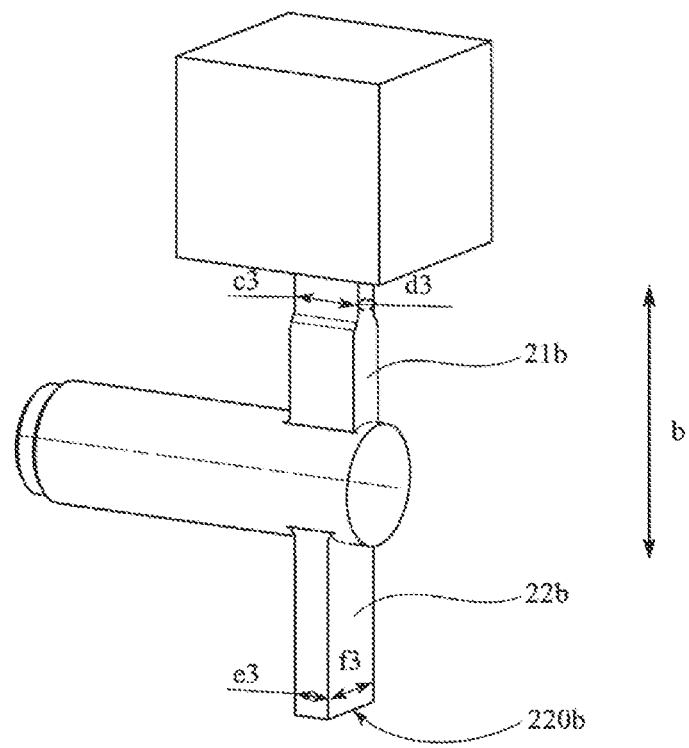
FIG. 6 shows a perspective schematic diagram of the third embodiment of the welding head assembly.

FIG. 6 shows a perspective schematic diagram of the third embodiment of the welding head assembly, the first vibrating rod 21b has the width (c3) and the thickness (d3), the working portion of the welding head 220b of the second vibrating rod 22b has the width (e3) and the thickness (f3).

In the third embodiment, the width (c3) of the first vibrating rod 21b is larger than the thickness (d3) of the first vibrating rod 21b in the cross section of the first vibrating rod 21b, therefore the first vibrating rod 21b is in a vertical vibrating rod configuration. The width (e3) of the working portion of the welding head 220b is smaller than the thickness (f3) of the working portion of the welding head 220b in the cross section of the working portion of the welding head 220b of the second vibrating rod 22b, therefore the second vibrating rod 22b is in a horizontal vibrating rod configuration, in which case the welding head is regarded as a horizontal welding head. By configuring the acoustic rod, the first vibrating rod and the connecting member to be integrally formed as one piece, the welding head assembly is in a configuration where a vertical upper vibrating rod and a horizontal welding head are combined, the welding head assembly with such configuration is particularly suitable for a horizontal welding scene where the horizontal space of the upper vibrating rod is limited and the lower vibrating rod needs the relatively large space for avoiding interference with other components.

The Fourth Embodiment

On the basis of the third embodiment, a fourth embodiment has various modifications as described in the later section. The modifications are described in detail as follows.

Figure 7:
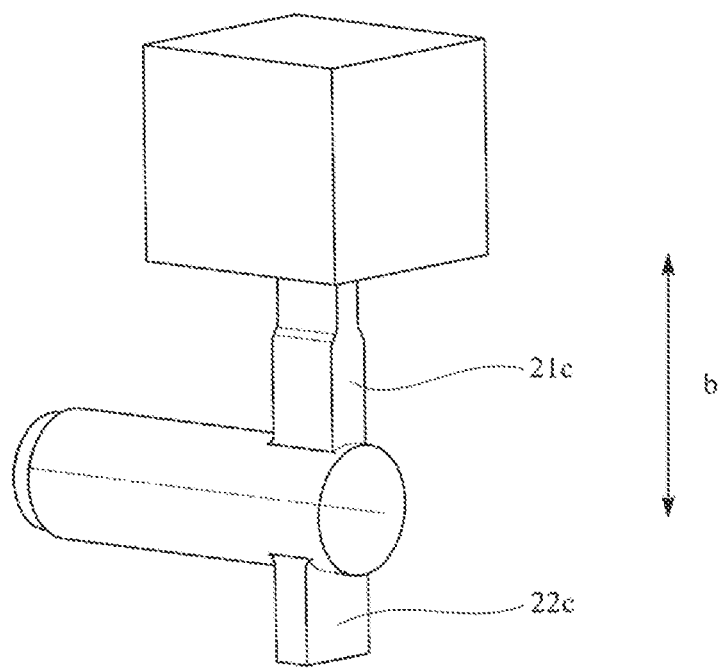
FIG. 7 shows a perspective schematic diagram of the fourth embodiment of the welding head assembly.

FIG. 7 shows a perspective schematic diagram of the fourth embodiment of the welding head assembly, the length of the first vibrating rod 21c is different from the length of the second vibrating rod 22c in the second length direction (b), where the length of the second vibrating rod 22c is smaller than the length of the first vibrating rod 21c. By configuring the acoustic rod, the first vibrating rod and the connecting member to be integrally formed as one piece, the welding head assembly is in a configuration where the lengths of the upper vibrating rod and the lower vibrating rod are different on the basis of combining a vertical upper vibrating rod and a horizontal welding head, the welding head assembly with such configuration is particularly suitable for a horizontal welding scene where the horizontal space of the upper vibrating rod is limited and the lower vibrating rod does not need the relatively large space for avoiding interference with other components.

The Fifth Embodiment

On the basis of the first embodiment, a fifth embodiment has various modifications as described in the later section. The modifications are described in detail as follows.

Figure 8:
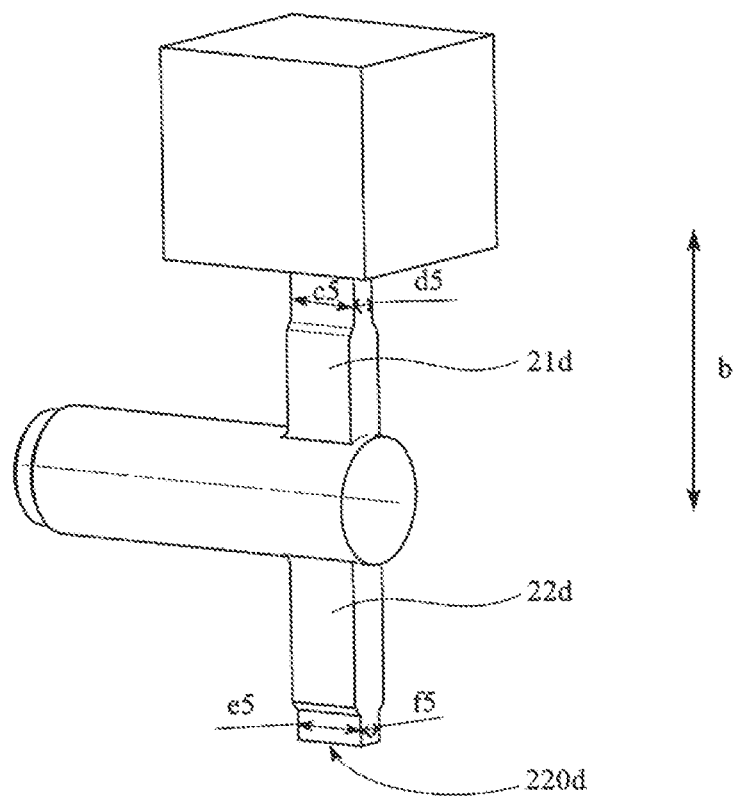
FIG. 8 shows a perspective schematic diagram of the fifth embodiment of the welding head assembly.

FIG. 8 shows a perspective schematic diagram of the fifth embodiment of the welding head assembly, the first vibrating rod 21d has the width (c5) and the thickness (d5), the working portion of the welding head 220d of the second vibrating rod 22d has the width (e5) and the thickness (f5).

In the fifth embodiment, the width (c5) of the first vibrating rod 21d is larger than the thickness (d5) of the first vibrating rod 21d in the cross section of the first vibrating rod 21d, therefore the first vibrating rod 21d is in a vertical vibrating rod configuration. The width (e5) of the working portion of the welding head 220d is larger than the thickness (f5) of the working portion of the welding head 220d in the cross section of the working portion of the welding head 220d of the second vibrating rod 22d, therefore the second vibrating rod 22d is also in a vertical vibrating rod configuration, in which case the welding head is regarded as a vertical welding head. By configuring the acoustic rod, the first vibrating rod and the connecting member to be integrally formed as one piece, the welding head assembly is in a configuration where a vertical upper vibrating rod and a vertical welding head are combined, the welding head assembly with such configuration is particularly suitable for a vertical welding scene where a vertical space of the upper vibrating rod is not limited and the lower vibrating rod needs the relatively large space for avoiding interference with other components.

The Sixth Embodiment

On the basis of the fifth embodiment, a sixth embodiment has various modifications as described in the later section. The modifications are described in detail as follows.

Figure 9:
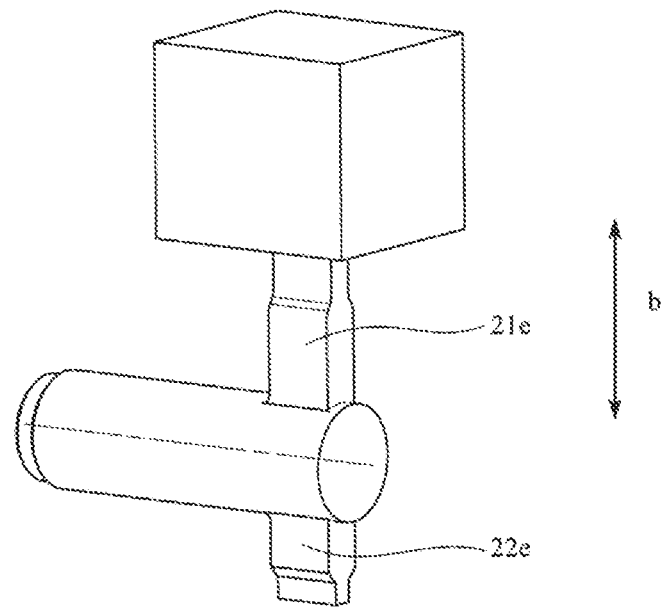
FIG. 9 shows a perspective schematic diagram of the sixth embodiment of the welding head assembly.

FIG. 9 shows a perspective schematic diagram of the sixth embodiment of the welding head assembly, the length of the first vibrating rod 21e is different from the length of the second vibrating rod 22e in the second length direction (b), where the length of the second vibrating rod 22e is smaller than the length of the first vibrating rod 21e. By configuring the acoustic rod, the first vibrating rod and the connecting member to be integrally formed as one piece, the welding head assembly is in a configuration where the lengths of the upper vibrating rod and the lower vibrating rod are different on the basis of combining a vertical upper vibrating rod and a vertical welding head, the welding head assembly with such configuration is particularly suitable for a vertical welding scene where the vertical space of the upper vibrating rod is not limited and the lower vibrating rod does not need the relatively large space for avoiding interference with other components.

The Seventh Embodiment

On the basis of the first embodiment, a seventh embodiment has various modifications as described in the later section. The modifications are described in detail as follows.

Figure 10:
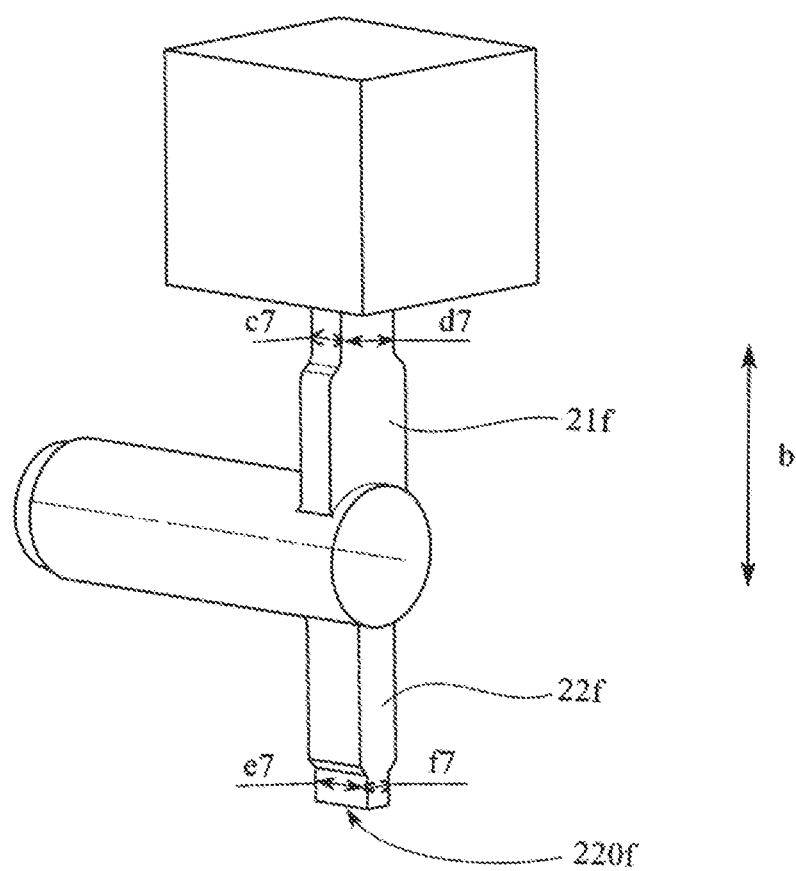
FIG. 10 shows a perspective schematic diagram of the seventh embodiment of the welding head assembly.

FIG. 10 shows a perspective schematic diagram of the seventh embodiment of the welding head assembly, the first vibrating rod 21f has the width (c7) and the thickness (d7), the working portion of the welding head 220f of the second vibrating rod 22f has the width (e7) and the thickness (f7).

In the seventh embodiment, the width (c7) of the first vibrating rod 21f is smaller than the thickness (d7) of the first vibrating rod 21f in the cross section of the first vibrating rod 21f, therefore the first vibrating rod 21f is in a horizontal vibrating rod configuration. The width (e7) of the working portion of the welding head 220f is larger than the thickness (f7) of the working portion of the welding head 220f in the cross section of the working portion of the welding head 220f of the second vibrating rod 22f, therefore the second vibrating rod 22f is also in a vertical vibrating rod configuration, in which case the welding head is regarded as a vertical welding head. By configuring the acoustic rod, the first vibrating rod and the connecting member to be integrally formed as one piece, the welding head assembly is in a configuration where a horizontal upper vibrating rod and a vertical welding head are combined, the welding head assembly with such configuration is particularly suitable for a vertical welding scene where the vertical space of the upper vibrating rod is limited and the lower vibrating rod needs the relatively large space for avoiding interference with other components.

The Eighth Embodiment

On the basis of the seventh embodiment, an eighth embodiment has various modifications as described in the later section. The modifications are described in detail as follows.

Figure 11:
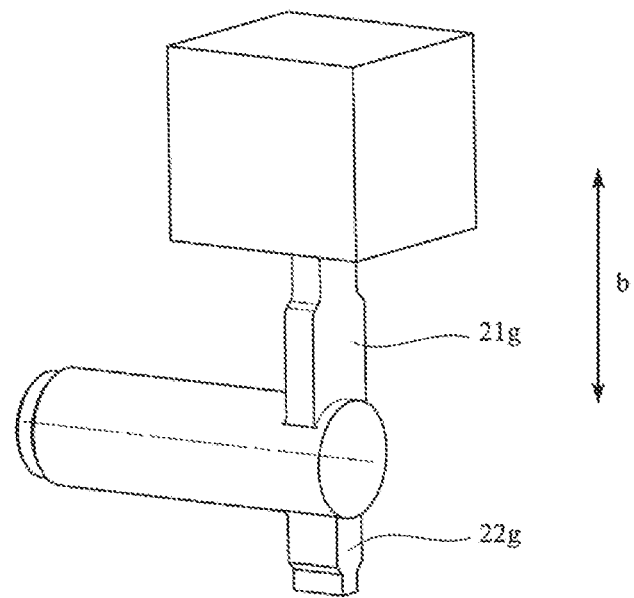
FIG. 11 shows a perspective schematic diagram of the eighth embodiment of the welding head assembly.

FIG. 11 shows a perspective schematic diagram of the eighth embodiment of the welding head assembly, the length of the first vibrating rod 21g is different from the length of the second vibrating rod 22g in the second length direction (b), where the length of the second vibrating rod 22g is smaller than the length of the first vibrating rod 21g. By configuring the acoustic rod, the first vibrating rod and the connecting member to be integrally formed as one piece, the welding head assembly is in a configuration where the lengths of the upper vibrating rod and the lower vibrating rod are different on the basis of combining a horizontal upper vibrating rod and a vertical welding head, the welding head assembly with such configuration is particularly suitable for a vertical welding scene where the vertical space of the upper vibrating rod is limited and the lower vibrating rod does not need the relatively large space for avoiding interference with other components.

In one or more embodiments of the first to the eighth embodiments mentioned above, the configuration of the first vibrating rod 21 and the second vibrating rod 22 may have other modifications and changes. For example, the second vibrating rod 22 has a variable cross section along the second length direction (b), in the fifth to the eighth embodiment as shown in FIG. 8 to FIG. 11, a portion of the second vibrating rod close to the working portion of the welding head has a converging and relatively small cross-sectional area as shown in the figures. In some other embodiments different from the ones shown in the figures, the first vibrating rod 21 and the second vibrating rod 22 can both have variable cross sections, or only one of the first vibrating rod 21 and the second vibrating rod 22 has a variable cross section, and the configuration of the cross section may be different from the ones shown in the figures. In the embodiments shown in FIG. 2 to FIG. 11, the cross sections of the first vibrating rod 21 and/or the second vibrating rod 22 are rectangular. In some other embodiments different from the ones shown in the figures, the cross sections of the first vibrating rod 21 and/or the second vibrating rod 22 can also be circular.

In one or more embodiments of the first to the eighth embodiments mentioned above, the configuration of the acoustic rod 1 may have other modifications and changes. For example, the acoustic rod 1 can be cylindrical as shown in the figures, or can be a prism, or have a variable cross section.

In one or more embodiments of the first to the eighth embodiments mentioned above, the length of the upper vibrating rod 21 can be the same as the length of the lower vibrating rod 22 along the direction (b), or the length of the upper vibrating rod can be larger than the length of the lower vibrating rod, or the length of the upper vibrating rod can be smaller than the length of the lower vibrating rod.

In one or more embodiments of the first to the eighth embodiments mentioned above, the configuration of the connecting member 3 may have other modifications and changes. For example, the connecting member 3 can be a cube as shown in the figures, or can be a cubic structure with a wedge-shaped structure, or can be a connection structure with a hole portion, or other connection structures suitable for clamping.

In one or more embodiments of the first to the eighth embodiments mentioned above, the width of the working portion of the welding head can be the same as the thickness of the working portion of the welding head, and/or the width of the first vibrating rod can be the same as the thickness of the first vibrating rod for adapting to various welding scenes. The welding head assembly with the configurations mentioned above can be obtained by configuring the acoustic rod, the first vibrating rod and the connecting member to be integrally formed as one piece.

The welding head assembly in one or more embodiments mentioned above can be applied to an ultrasonic welding machine, where the acoustic rod of the welding head assembly is connected with a transducer or an amplitude modulator of the ultrasonic welding machine, the ultrasonic welding machine is provided with a clamping structure, the clamping structure is used for clamping the connecting member 3 of the welding head assembly, and the ultrasonic welding machine applies a force to the welding head assembly through the connecting member 3.

Although the present invention has been disclosed with respect to the preferred embodiments mentioned above, the embodiments are not intended to limit the present invention, and any person skilled in the art can make possible changes and modifications without departing from the spirit and scope of the present invention. Therefore, any alternatives, equivalent changes and modifications made to the above embodiments according to the technical essence of the present invention that do not depart from the technical solution of the present invention shall fall within the scope of protection defined by the claims of the present invention.

The invention claimed is:

1. A welding head assembly for ultrasonic welding comprising an acoustic rod, a vibrating rod and a connecting member,
    wherein the vibrating rod is separated into two pieces, thereby separated into a first vibrating rod and a second vibrating rod by the acoustic rod,
    wherein the first vibrating rod is connected with the acoustic rod and the connecting member, one end of the second vibrating rod is connected with the acoustic rod, and the other end of the second vibrating rod is configured to be the working portion of the welding head;

wherein the acoustic rod, the first vibrating rod and the connecting member are integrally formed as one piece;

wherein during ultrasonic welding, when ultrasonic waves propagate on the first vibrating rod and the second vibrating rod, at least one node of acoustic mode occurs on the first vibrating rod and the second vibrating rod respectively; and wherein a joint of the connecting member and the first vibrating rod is located at a position of a node.

2. The welding head assembly according to claim 1, wherein the second vibrating rod is integrally formed as one piece together with the acoustic rod, the first vibrating rod and the connecting member.

3. The welding head assembly according to claim 1, wherein the acoustic rod extends along a first length direction that is the same as a propagation direction of an ultrasonic wave on the acoustic rod during ultrasonic welding, the first vibrating rod and the second vibrating rod extend along a second length direction respectively, the second length direction is perpendicular to the first length direction;

wherein a length of the first vibrating rod is different from a length of the second vibrating rod in the second length direction.

4. The welding head assembly according to claim 3, wherein a cross section of the first vibrating rod and/or the second vibrating rod varies along the second length direction; the acoustic rod has a variable cross section along the first length direction.

5. The welding head assembly according to claim 1, wherein a width of the working portion of the welding head is larger than or equal to a thickness of the working portion of the welding head.

6. The welding head assembly according to claim 3, wherein a distance from an upper end surface of the connecting member to a central line of the acoustic rod is between 143 mm and 148 mm.

7. The welding head assembly according to claim 6, wherein a distance from a lower end surface of the second vibrating rod to the central line of the acoustic rod is between 79 mm and 87 mm.

8. The welding head assembly according to claim 7, wherein a distance from a lower end surface of the second vibrating rod to the central line of the acoustic rod is between 43 mm and 63 mm.

9. The welding head assembly according to claim 1, wherein the first vibrating rod is one of a horizontal vibrating rod configuration and a vertical vibrating rod configuration, and the second vibrating rod is one of a horizontal vibrating rod configuration and a vertical vibrating rod configuration.

10. The welding head assembly according to claim 1, wherein a cross section of the first vibrating rod and/or the second vibrating rod are in a shape of circular or rectangular; the acoustic rod is in a shape of cylinder or prism.

11. The welding head assembly according to claim 1, wherein the second vibrating rod is configured to be replaceable.

12. An ultrasonic welding machine comprising a transducer or an amplitude modulator, a clamping structure and a welding head assembly for ultrasonic welding, wherein the welding head assembly comprises an acoustic rod, a vibrating rod and a connecting member, wherein the vibrating rod is separated into two pieces, thereby separated into a first vibrating rod and a second vibrating rod by the acoustic rod, the first vibrating rod is connected with the acoustic rod and the connecting member, one end of the second vibrating rod is connected with the acoustic rod, and the other end of the second vibrating rod is configured to be the working portion of the welding head;

wherein the acoustic rod, the first vibrating rod and the connecting member are integrally formed as one piece;

wherein during ultrasonic welding, when ultrasonic waves propagate on the first vibrating rod and the second vibrating rod, at least one node of acoustic mode occurs on the first vibrating rod and the second vibrating rod respectively;

wherein a joint of the connecting member and the first vibrating rod is located at a position of a node; and wherein the acoustic rod is connected with the transducer or the amplitude modulator; the clamping structure is used for clamping the connecting member, thereby the ultrasonic welding machine applying a force to the welding head assembly through the connecting member.

13. The ultrasonic welding machine according to claim 12, wherein the second vibrating rod is integrally formed as one piece together with the acoustic rod, the first vibrating rod and the connecting member.

14. The ultrasonic welding machine according to claim 12, wherein the acoustic rod extends along a first length direction that is the same as a propagation direction of an ultrasonic wave on the acoustic rod during ultrasonic welding, the first vibrating rod and the second vibrating rod extend along a second length direction respectively, the second length direction is perpendicular to the first length direction;

wherein a length of the first vibrating rod is different from a length of the second vibrating rod in the second length direction.

15. The ultrasonic welding machine according to claim 14, wherein a distance from an upper end surface of the connecting member to a central line of the acoustic rod is between 143 mm and 148 mm.

16. The ultrasonic welding machine according to claim 15, wherein a distance from a lower end surface of the second vibrating rod to the central line of the acoustic rod is between 79 mm and 87 mm.

17. The welding head assembly according to claim 16, wherein a distance from a lower end surface of the second vibrating rod to the central line of the acoustic rod is between 43 mm and 63 mm.

18. The welding head assembly according to claim 12, wherein the first vibrating rod is one of a horizontal vibrating rod configuration and a vertical vibrating rod configuration, and the second vibrating rod is one of a horizontal vibrating rod configuration and a vertical vibrating rod configuration.

19. The welding head assembly according to claim 12, wherein a width of the working portion of the welding head is larger than or equal to a thickness of the working portion of the welding head.

20. The welding head assembly according to claim 12, wherein the second vibrating rod is configured to be replaceable.

* * * * *